United States Patent [19] [11] 4,038,451
Brown et al. [45] July 26, 1977

[54] COMPOSITIONS COMPRISING POLYALKYLENEPOLYAMINES AND A MIXTURE OF MONO- AND DIAMMONIUM PHOSPHATES AS FIRE RETARDANTS FOR CELLULOSIC SUBSTRATES

[75] Inventors: Frederick L. Brown, Midland, Mich.; James L. Potter, Lake Jackson, Tex.

[73] Assignee: The Dow Chemical Company, Midland, Mich.

[21] Appl. No.: 617,359

[22] Filed: Sept. 29, 1975

[51] Int. Cl.² .................... B32B 7/00; B32B 23/00
[52] U.S. Cl. .................... 428/274; 8/116 P; 162/159; 162/164 R; 252/8.1; 260/2 EP; 260/2 N; 260/9; 427/390 D; 428/541; 428/921
[58] Field of Search ............ 260/2 EP, 2 N, 9; 252/8.1; 162/159; 427/390 D; 428/274, 921, 541; 8/116 P

[56] References Cited

U.S. PATENT DOCUMENTS

| | | | |
|---|---|---|---|
| 3,634,234 | 1/1972 | Morgenthaler | 252/8.1 |
| 3,671,304 | 6/1972 | Mischutin | 252/8.1 |
| 3,758,641 | 9/1973 | Zweigle | 427/440 |
| 3,900,327 | 8/1975 | Miller | 162/159 |
| 3,935,343 | 1/1976 | Nuttall | 427/440 |

*Primary Examiner*—Edward M. Woodberry
*Attorney, Agent, or Firm*—L. Wayne White

[57] ABSTRACT

Cellulosic substrates, e.g. wood, textiles or paper, have increased fire resistance when treated with an aqueous solution of a polyalkylenepolyamine (e.g. polyethylenimine) and a mixture of mono- and diammonium phosphate.

10 Claims, No Drawings

COMPOSITIONS COMPRISING POLYALKYLENEPOLYAMINES AND A MIXTURE OF MONO- AND DIAMMONIUM PHOSPHATES AS FIRE RETARDANTS FOR CELLULOSIC SUBSTRATES

BACKGROUND OF THE INVENTION

It is known to impart fire-resistance to cellulosic substrates by impregnation with certain agents. See, for example, U.S. Pat. No. 2,870,042 (textiles); U.S. Pat. No. 3,027,295 (paper); U.S. Pat. No. 3,242,004 (wood). In general, the fireproofing agents fall into two classes: (1) non-permanent materials that are susceptible to leaching, e.g. the phosphates, borates and sulfonates, and (2)permanent materials that are leachproof, e.g. tris(1-aziridinyl) phosphine oxide and melamine resins. It is, of course, more desirable to have permanent protection but the permanent materials have several processing difficulties that render commercial fireproofing impractical. E.g. toxicity, long curing times, high temperature curing and multiple stage processes requiring expensive equipment.

One step in solving the above problems was described in U.S. Pat. No. 3,565,679 in which cellulosic substrates were rendered fire-resistant by treatment with an aqueous solution of a complex of a polyalklenepolyamine and a condensation product of phosphorus pentoxide and ammonia.

SUMMARY OF THE INVENTION

It has now been discovered that cellulosic substrates can be rendered fire-resistant by treatment with an aqueous solution of a polyalkylenepolyamine and a mixture of mono- and diammonium phosphate.

DETAILED DESCRIPTION OF THE INVENTION

The polyalkylenepolyamines useful in this invention are well known in the art and include those obtained from reacting an alklenepolyamine (e.g. ethylenediamine, 1, 2-propylenediamine, diethylenetriamine, tetraethylenepentamine, etc.) with a difunctional chain-extending and cross-linking agent (e.g. 1, 2-dichloroethane, epichlorohydrin, etc.). Also included within the term polyalkylenepolyamine is polyethylenimine, generally produced by the polymerization of ethylenimine in the presence of an acid catalyst, the corresponding polypropylenimines, and the like. Polyethylene polyamines and polyethylenimines are preferred for use herein, based on their commericial availability. In general, the number average molecular weight of the polyalklenepolyamines used in this invention is between about 1,000 and about 100,000 and preferably is between about 20,000 and about 60,000. The number average molecular weights of the polyalkylene polyamines can be determined by any one of several techniques, but gel permeation chromatography is the method of choice.

Substantially any mixture of monoammonium phosphate and diammonium phosphate can be used in the instant invention but best results are obtained using mixtures containing from 20 to 80 weight percent monoammonium phosphate with the remainder being diammonium phosphate. The most preferred mixture contains from about 35 to about 45 weight percent monoammonium phosphate with the remainder being diammonium phosphate.

In the practice of this invention, the aqueous solution of polyalkylenepolyamine and mixture of mono- and diammonium phosphate is applied to the cellulosic substrate in any conventional manner, e.g. spraying, painting, dipping, roll coating, reverse roll coating, pressure or vacuum treating, precipitation on fiber slurries, etc. Normally, a dilute solution of the fire retardant mixture is used (e.g. from about 5 to about 50 weight percent solids). After application, the treated substrate is normally dried at elevated temperatures to remove the solvent (water).

The cellulosic substrates which can be protected by the instant invention include wood, textiles and paper. Any species of wood is protected by the practice of this invention (e.g. softwood such as southern pine and ponderosa pine, hardwood such as maple and oak and wood products (e.g. plywood, particle board, etc.)) are protected as well as paper.

The instant invention can also be used directly in wood or paper pulps and the like in the formation of such items as a paper, cardboard, etc.

EXPERIMENTAL

The following examples will further illustrate the invention.

EXAMPLE 1

Hardboard and various plywood samples were vacuum-pressure treated in an aqueous solution of 12 parts of weight of a polyethylenimine (having a number average molecular weight of from 40,000 to 60,000) and a Brookfield viscosity (as a 5 percent aqueous solution) of 28 cps at 25° C and marketed by The Dow Chemical Company under the name PEI 600) and 88 parts by weight of a 40/60 weight percent mixture of mono/-diammonium phosphate at to dilutions. The aqueous treating solutions contained 16 weight solids in Runs 4 and 7 and 35 weight percent solids in Runs 2 and 5. Runs 1, 3 and 6 were blanks or control samples. The treated hardwood and plywood samples were then stage dried in a forced air oven for 4 hours at 65.56° C, 4 hours at 85° C and 8 hours at 104.44° C. The samples were weighed to determine the weight percent retention of the instant fire retardant composition in the wood samples. The treated samples were then tested pursuant to ASTM E-84-24-foot tunnel test. The results of these tests are found in Table I below.

Table I

| Run No. | Substrate | Retention of Fire-Retardant Solids (% by weight) | Flame Spread Factor | Fuel Factor | Smoke Factor |
|---|---|---|---|---|---|
| 1 | 1/4" Hardboard | None | 196 | 119 | 496 |
| 2 | 1/4" Hardboard | 19.4 | 76 | 19 | 238 |
| 3 | 1/4" Plywood | None | 193 | 122 | 122 |
| 4 | 1/4" Plywood | 16.5 | 23 | 0 | 62 |
| 5 | 1/4" Plywood | 39.5 | 15 | 0 | 170 |
| 6 | 3/8" Plywood | None | 148 | 92 | 29 |
| 7 | 3/8" Plywood | 13.6 | 21 | 0 | 75 |

The data in Table I show the solutions of polyalkylenepolyamine in mixture of mono- and diammonium phosphates to be very useful as flame retardants.

EXAMPLES 2-6

In another series of experiments, samples of Southern Yellow Pine sapwood were similarly treated with aqueous solutions (35 weight percent total solids) of 12 parts by weight of a polyethylenimine (PEI 600) and 88 parts by weight of various mixtures of mono- and diammonium phosphate. The treated samples were dried tested according to the "Crib Test" defined in ASTM E 160-50 which specifies a temperature of 315° C at a distance 17 inches above the burner grid and a moisture content of between 4 and 10 weight percent. The data are summarized in Table II and show that a wide range of mixtures of mono- and diammonium phosphate are useful in the instant fire-retardant compositions.

Table II

| Ex. | MAP/-DAP* Ratio | Weight** gain (%) | Flame-Out (Seconds) | After-Glow (Seconds) | Sample Weight (grams) Before Burn | Sample Weight (grams) After Burn |
|---|---|---|---|---|---|---|
| 2 | 20/80 | 33.48 | 90 | 0 | 211.5 | 178.2 |
| 3 | 30/70 | 30.17 | 45 | 0 | 218.2 | 192.9 |
| 4 | 40/60 | 43.96 | 38 | 0 | 230.6 | 201.3 |
| 5 | 70/30 | 31.78 | 65 | 0 | 224.9 | 200.1 |
| 6 | 80/20 | 48.51 | 5 | 9 | 242.0 | 215.2 |

*MAP/DAP ratio is the weight ratio of monoammonium phosphate to diammonium phosphate.
**Percent weight gain is based on the weight of the dry untreated wood.

The instant fire retardant compositions also have advantages over the prior art materials. The instant fire retardant compositions tend to be less hygroscopic than prior art compounds (e.g. those in U.S. Pat. No. 3,565,679) which leads to improved dimensional stability and a more stable appearance. Some of the prior art compounds absorbed water into treated wood which caused the fire retardant material to bleed to the surface and present an undesirable physical appearance. Additionally, the instant fire retardant compositions are easily diluted with water to any desirable concentration whereas those in U.S. Pat. No. 3,565,679, for example, required very careful treatment during dilution to prevent precipitation of the solids from the aqueous composition. This physical property of the instant fire retardant composition thus leads to considerable process advantages over the prior art. Additionally, since the instant fire retardant composition does not require the presence of any volatile base to adjust the pH, it is less corrosive in metal containers (e.g. mild steel, stainless steel, etc.). This physical property likewise leads to economic advantages.

We claim:

1. A composition comprising a polyalkylenepolyamine having a number average molecular weight between about 1,000 and about 100,000 and a mixture of monoammonium phosphate and diammonium phosphate.

2. The composition defined by claim 1 wherein the polyalkylenepolyamine is polyethylenepolyamine or polyethylenimine.

3. The composition defined by claim 1 in which the mixture of monoammonium phosphate and diammonium phosphate consist of from 20 to 80 percent monoammonium phosphate with the remainder being diammonium phosphate.

4. The composition defined by claim 3 wherein the mixture of mono- to diammonium phosphate consists of from about 35 to about 45 weight percent of the monoammonium phosphate with the remainder being the diammonium phosphate.

5. The composition defined by claim 4 wherein said mixture consists of 40 percent monoammonium phosphate and 60 percent diammonium phosphate and wherein said polyalkylenepolyamine is a polyethylenimine having an average molecular weight of from about 40,000 to about 60,000.

6. Wood containing the composition described by claim 1.

7. A cellulosic textile containing the composition described by claim 1.

8. A paper containing the composition described by claim 1.

9. Wood or paper pulp containing the composition defined by claim 1.

10. A method of imparting fire retardancy to a cellulosic article comprising contacting said cellulosic article with an aqueous solution of the composition defined by claim 1 and thereafter drying the cellulosic article at an elevated temperature to remove the aqueous solvent.

* * * * *

UNITED STATES PATENT AND TRADEMARK OFFICE
CERTIFICATE OF CORRECTION

PATENT NO. : 4,038,451

DATED : July 26, 1977

INVENTOR(S) : Frederick L. Brown and James L. Potter

It is certified that error appears in the above-identified patent and that said Letters Patent are hereby corrected as shown below:

Column 1, line 27: "polyalklenepolyamine" should read --polyalkylenepolyamine--.

Column 1, line 41: "alklenepolyamine" should read --alkylenepolyamine--.

Column 1, line 53: "lyalklenepolyamines" should read --lyalkylenepolyamines--.

Column 2, line 21: The word "a" should be deleted.

Column 2, line 29: "of" second occurrence, should read -- by --.

Column 2, line 36: "to" should read --two--.

Column 2, line 37: "16 weight solids" should read --16 weight percent solids--.

Column 3, line 12: In Table II, the heading "Weight (grams" should read --Weight (grams)--.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks